(12) United States Patent
Chernov et al.

(10) Patent No.: US 11,339,047 B2
(45) Date of Patent: May 24, 2022

(54) DISPENSE CONTROL SYSTEM FOR A REFRIGERATOR APPLIANCE

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 18 days.

(21) Appl. No.: 16/547,838

(22) Filed: Aug. 22, 2019

(65) Prior Publication Data

US 2021/0053812 A1 Feb. 25, 2021

(51) Int. Cl.
| | | |
|---|---|---|
| *A47J 31/00* | (2006.01) | |
| *B67D 1/12* | (2006.01) | |
| *B67D 1/08* | (2006.01) | |
| *G01S 17/42* | (2006.01) | |
| *F25D 29/00* | (2006.01) | |
| *G01F 17/00* | (2006.01) | |
| *G01F 22/00* | (2006.01) | |
| *G01F 23/80* | (2022.01) | |
| *F25D 23/12* | (2006.01) | |
| *G01F 23/292* | (2006.01) | |

(52) U.S. Cl.
CPC ......... *B67D 1/1236* (2013.01); *B67D 1/0878* (2013.01); *B67D 1/0882* (2013.01); *B67D 1/0888* (2013.01); *B67D 1/1238* (2013.01); *F25D 29/00* (2013.01); *G01F 17/00* (2013.01); *G01F 22/00* (2013.01); *G01F 23/80* (2022.01); *G01S 17/42* (2013.01); *F25D 23/126* (2013.01); *G01F 23/292* (2013.01)

(58) Field of Classification Search
CPC .. B67D 1/1236; B67D 1/0882; B67D 1/1238; B67D 1/0878; B67D 1/0888; G01F 22/00; G01F 23/0061; G01F 23/292; G01F 17/00; G01S 17/42; F25D 29/00; F25D 23/126
See application file for complete search history.

(56) References Cited

U.S. PATENT DOCUMENTS

| | | | | |
|---|---|---|---|---|
| 4,883,100 A | * | 11/1989 | Stembridge | ........... B06B 1/0681 141/1 |
| 5,862,844 A | * | 1/1999 | Perrin | ............... B67D 1/124 141/351 |

(Continued)

FOREIGN PATENT DOCUMENTS

| | | | | |
|---|---|---|---|---|
| EP | 3409150 A1 | * | 12/2018 | ............ A47J 31/44 |
| KR | 101830496 B1 | | 2/2018 | |

*Primary Examiner* — Nicolas A Arnett
(74) *Attorney, Agent, or Firm* — Dority & Manning, P.A.

(57) ABSTRACT

A dispense control system for filling a container using a dispensing assembly of a refrigerator appliance and a method for operating the same are provided. The dispense control system includes an emitter for generating a beam of energy and a scanning assembly for selectively directing the beam of energy along a scan path comprising a plurality of scan positions. A receiver detects the beam of energy reflected by the container or the liquid at each of the plurality of scan positions and a controller determines a height of the container or the liquid at each of the plurality of scan positions along the scan path based at least in part on a travel time of the beam of energy between the emitter and the receiver.

16 Claims, 8 Drawing Sheets

(56) References Cited

U.S. PATENT DOCUMENTS

| | | | | |
|---|---|---|---|---|
| 6,394,153 B2* | 5/2002 | Skell | ............... | B67D 1/1238 |
| | | | | 141/351 |
| 6,789,585 B1* | 9/2004 | Janke | ............... | F25D 23/126 |
| | | | | 141/198 |
| 7,690,403 B2* | 4/2010 | You | ............... | B67D 1/0871 |
| | | | | 141/83 |
| 8,109,301 B1* | 2/2012 | Denise | ............... | F25D 23/028 |
| | | | | 141/360 |
| 8,353,321 B2* | 1/2013 | Agam | ............... | B67D 1/124 |
| | | | | 141/198 |
| 8,695,646 B2* | 4/2014 | Agam | ............... | G01S 7/527 |
| | | | | 141/95 |
| 8,813,794 B2 | 8/2014 | Ashrafzadeh et al. | | |
| 9,057,556 B2 | 6/2015 | Ashrafzadeh et al. | | |
| 9,534,360 B2* | 1/2017 | Toivonen | ............... | E03C 1/057 |
| 10,829,362 B2* | 11/2020 | Chernov | ............... | B67D 1/0888 |
| 10,858,235 B2* | 12/2020 | Jung | ............... | B01D 35/04 |
| 10,947,104 B2* | 3/2021 | Chernov | ............... | F25D 23/126 |
| 2008/0190514 A1* | 8/2008 | Lee | ............... | G01F 23/2962 |
| | | | | 141/95 |
| 2008/0264092 A1* | 10/2008 | Chase | ............... | F25D 23/126 |
| | | | | 62/389 |
| 2015/0121942 A1* | 5/2015 | Yun | ............... | F25C 5/187 |
| | | | | 62/344 |

* cited by examiner

DISPENSE CONTROL SYSTEM FOR A REFRIGERATOR APPLIANCE

FIELD OF THE INVENTION

The present subject matter relates generally to refrigerator appliances, and more particularly to dispense control systems for refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

In addition, conventional refrigerator appliances include dispensing assemblies for dispensing liquid water and/or ice, e.g., through a dispenser mounted on a front of the appliance or within the cabinet. These dispensing assemblies typically operate by dispensing water and/or ice while a container is pressed against a paddle or the user is pressing a button to activate the dispenser. Certain dispensing assemblies also include features for filling containers with a specified volume of water or use other systems to fill a container to a specific level. However, such systems or features are typically complex and include costly moving parts, such as moving water level scanners or sensors. Thus, improvements in water level detection and container fill systems are generally desired.

Accordingly, a refrigerator appliance with an improved dispensing assembly would be useful. More particularly, a dispensing assembly for a refrigerator appliance which includes features for simply and precisely filling a container with water or ice would be particularly beneficial.

BRIEF DESCRIPTION OF THE INVENTION

Aspects and advantages of the invention will be set forth in part in the following description, or may be apparent from the description, or may be learned through practice of the invention.

In a first exemplary embodiment, a refrigerator appliance is provided including a cabinet defining a chilled chamber, a door being rotatably hinged to the cabinet to provide selective access to the chilled chamber, the door defining a dispenser recess, and a dispensing assembly positioned within the dispenser recess. A dispense control system is operably coupled to the dispensing assembly for filling a container with a liquid. The dispense control system includes an emitter for generating a beam of energy, a receiver for detecting the beam of energy reflected by the container or the liquid at one or more scan positions, and a controller for determining a height of the container or the liquid at each of the one or more of scan positions based at least in part on a travel time of the beam of energy between the emitter and the receiver.

According to another exemplary embodiment, a dispense control system is provided for regulating a dispensing assembly to fill a container with a liquid. The dispense control system includes an emitter for generating a beam of energy, a receiver for detecting the beam of energy reflected by the container or the liquid at each of one or more scan positions, and a controller for determining a height of the container or the liquid at each of the one or more scan positions based at least in part on a travel time of the beam of energy between the emitter and the receiver.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
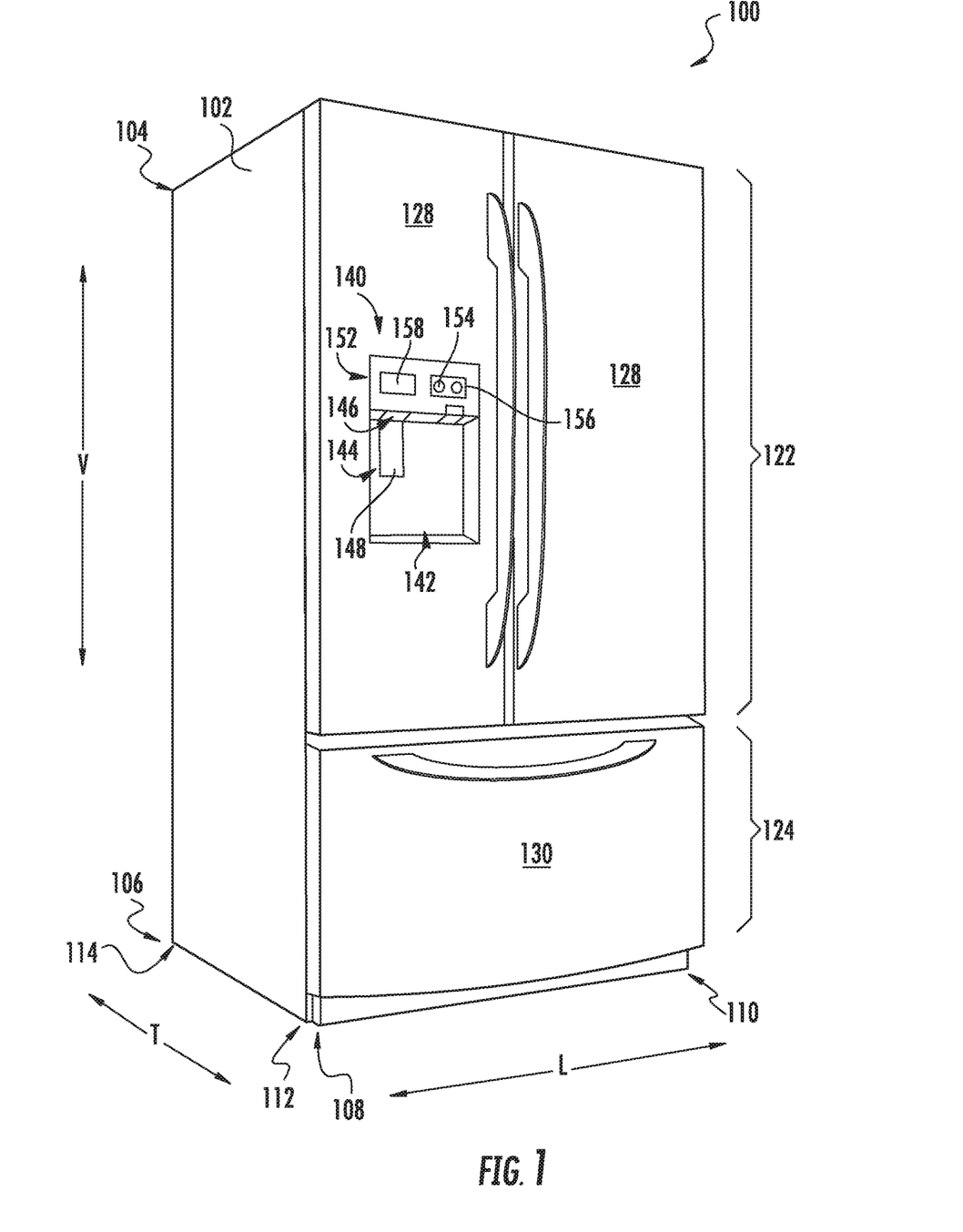
FIG. 1 provides a perspective view of a refrigerator appliance according to an exemplary embodiment of the present subject matter.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well, such as other appliances including fluid dispensers. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
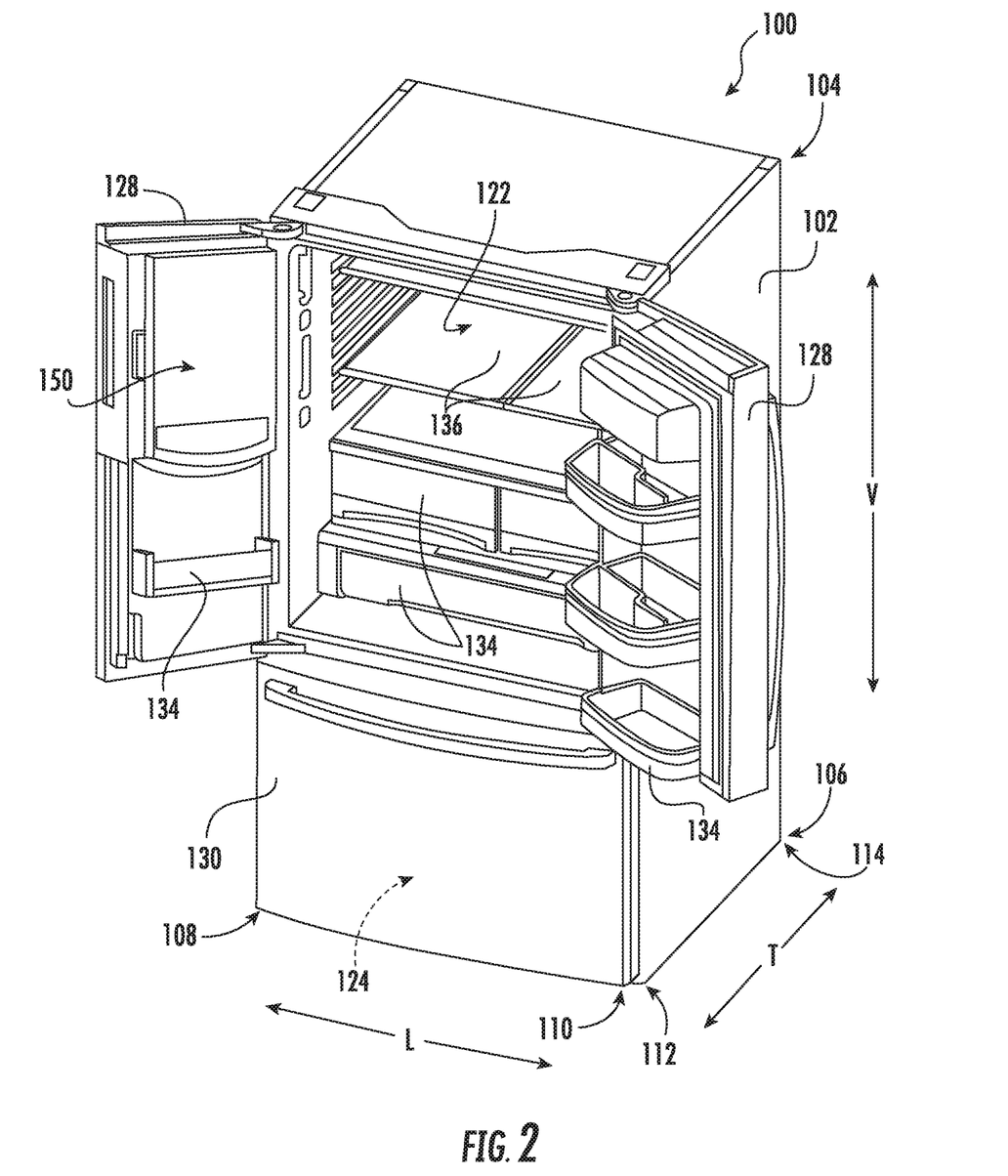
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice or water dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice or water dispenser 144. For example, ice or water dispenser 144 can include a sensor (such as an ultrasonic sensor) or a button rather than the paddle. Discharging outlet 146 and actuating mechanism 148 are an external part of ice or water dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Figure 3:
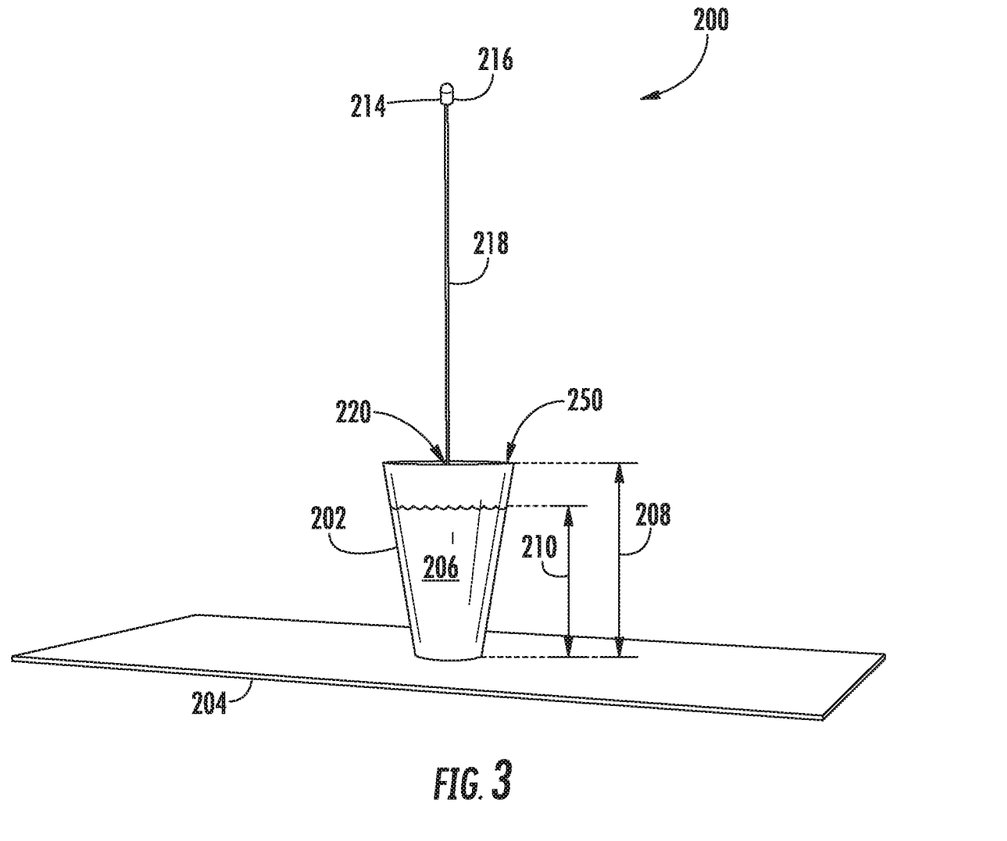
FIG. 3 provides a perspective view of a one-dimensional (1-D) dispense control system that may be used with the exemplary refrigerator appliance of FIG. 1 according to an exemplary embodiment of the present subject matter.
Figure 4:
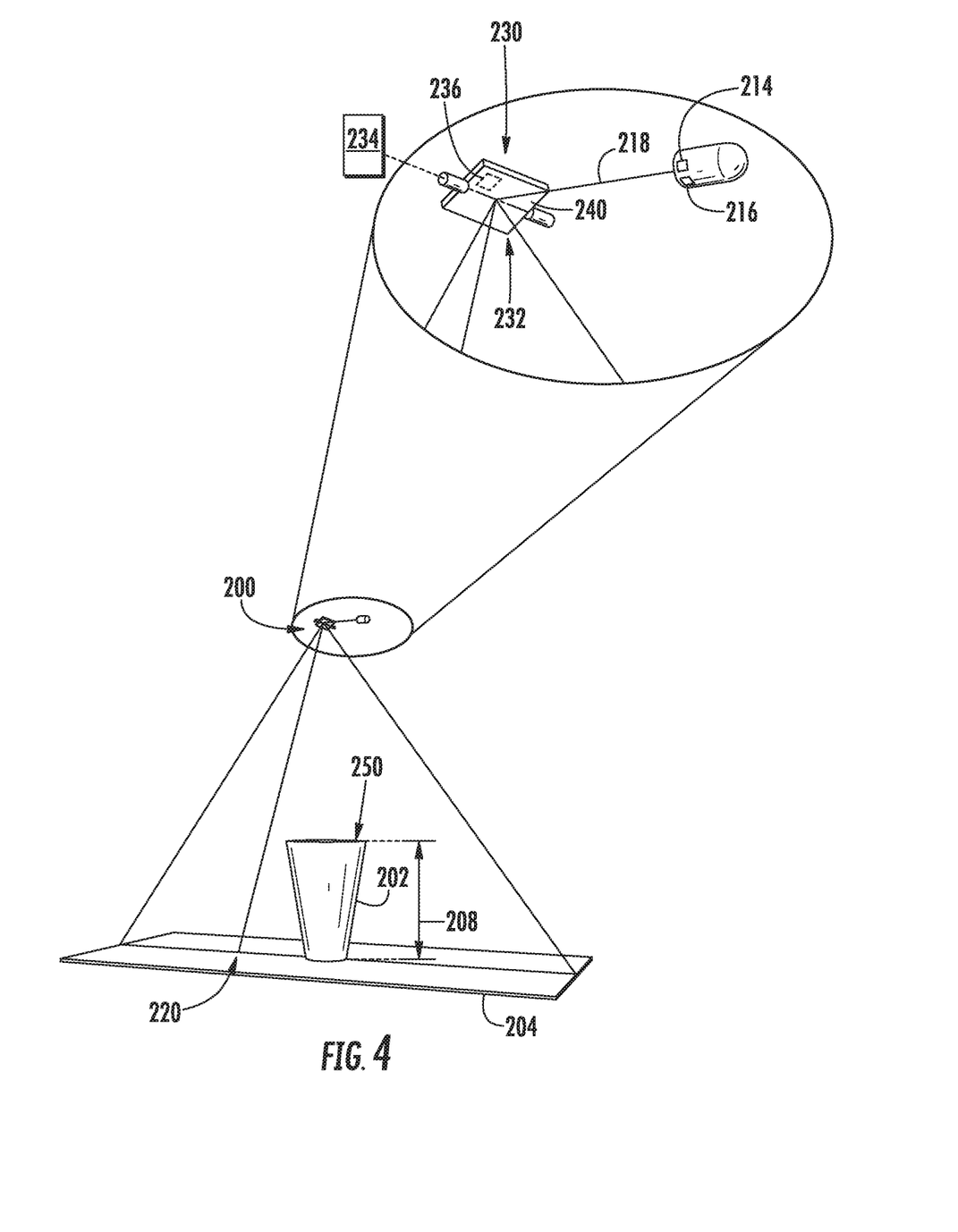
FIG. 4 provides a perspective view of a two-dimensional (2-D) dispense control system that may be used with the exemplary refrigerator appliance of FIG. 1 to generate a two-dimensional representation of a container according to another exemplary embodiment of the present subject matter.
Figure 5:
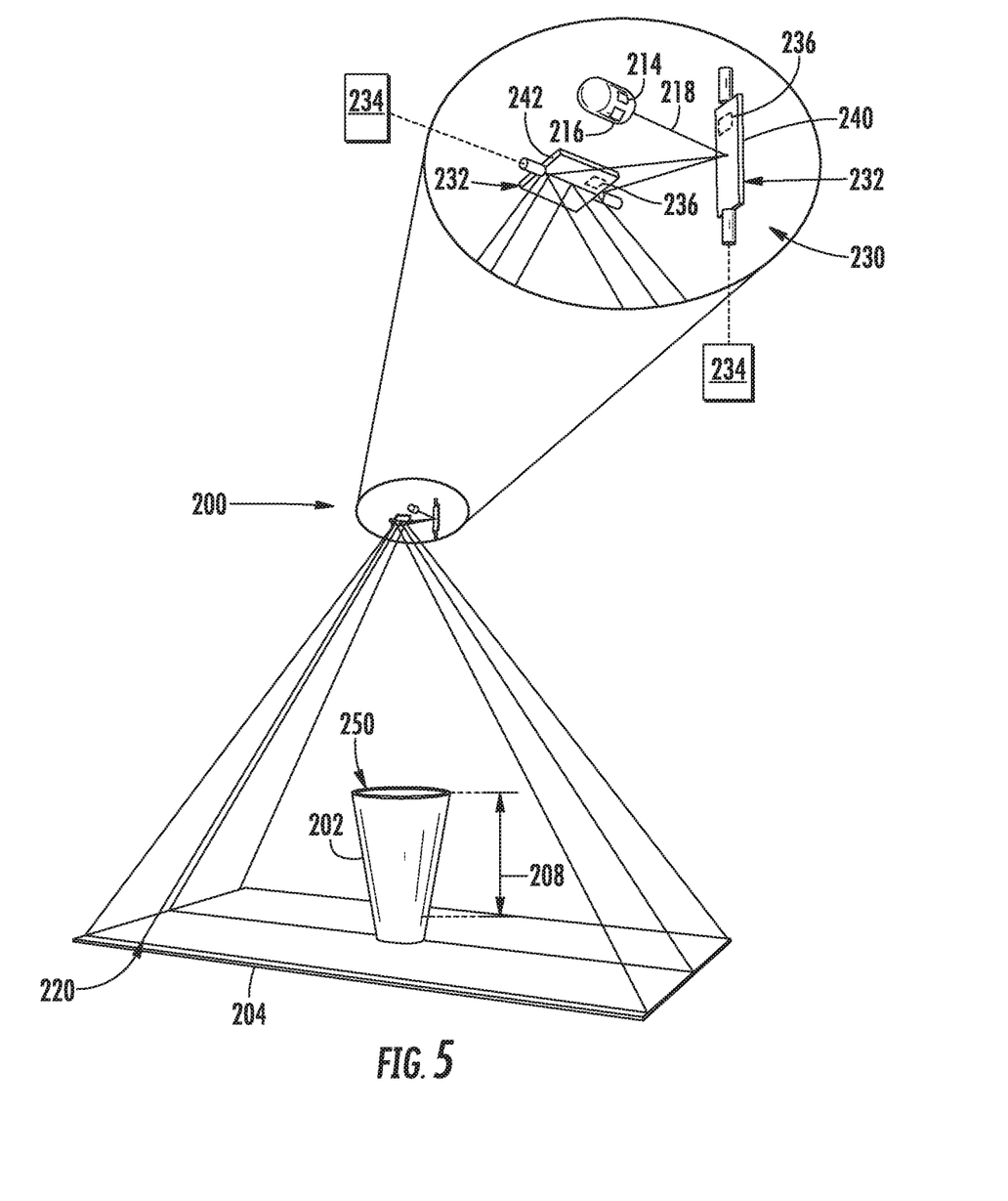
FIG. 5 provides a perspective view of a three-dimensional (3-D) dispense control system that may be used with the exemplary refrigerator appliance of FIG. 1 to generate a three-dimensional representation of a container according to another exemplary embodiment of the present subject matter.

Referring now generally to FIGS. 3 through 5, dispense control systems 200 which may be used with refrigerator appliance 100 will be described according to exemplary embodiments of the present subject matter. Specifically, FIGS. 3 through 5 illustrate 1-D, 2-D, and 3-D dispense control systems 200, respectively, according to exemplary embodiments. Due to the similarity between the embodiments disclosed, like references numerals may be used to refer to the same or similar features for each of these embodiments.

Dispense control system 200 may generally define an X-Y-Z coordinate system, in which the Z-direction corresponds substantially with the lateral direction L, the Y-direction corresponds substantially with the vertical direction V, and the X-direction corresponds substantially with the transverse direction T of refrigerator appliance 100. It should be appreciated that as used herein, terms of approximation, such as "approximately," "substantially," or "about," refer to being within a ten percent margin of error.

In general, these dispense control systems 200 may be used with dispensing assembly 140 of refrigerator appliance 100 to dispense a desired amount or level of water into a container 202, which may be a cup, utensil, pot, or other storage reservoir. In this regard, dispensing assembly 140 may define a surface for receiving container 202, referred to herein as a base plane 204, which may be positioned at the bottom of dispenser recess 142. In general, when container 202 is placed on base plane 204, it is in the field of view of dispense control system 200, which may measure a height, fill level, and other characteristics of container 202 or a liquid (identified herein by reference numeral 206) contained therein.

Dispense control system 200 is generally used to obtain water level and container geometry measurements necessary to implement automatic dispense for a beverage machine (i.e., an autofill process). In this regard, according to exemplary embodiments, dispense control system 200 generates a 2-D or 3-D representation of dispenser recess 142, any container 202 positioned therein, and/or the volume or height of liquid 206 stored within container 202.

For example, according to an exemplary embodiment, dispense control system 200 may use a laser imaging, detection, and ranging (LiDAR) system to map the dispenser recess 142, e.g., including container 202 and liquid 206 contained therein, as described in more detail below. For example, as illustrated schematically in FIG. 3, dispense control system 200 may be used to measure a container height 208 and a liquid level 210. In this manner, by continuously monitoring the dispensing process, dispense control system 200 may prevent overflows by maintaining liquid level 210 below container height 208.

According to still alternative embodiments, dispense control system 200 may be used to determine and empty volume of container 202, and to dispense liquid 206 to a desired fill volume that is less than the empty volume. In this regard, for example, when a container 202 is placed on base plane 204, dispense control system 200 may perform an initial scan to determine the internal dimensions of container 202. From these dimensions, controller 156 may determine the empty volume of container 202. During the fill process, dispense control system 200 may ensure that the dispensed volume of liquid 206 remains below the determined empty volume. More specifically, for example, a user may set a threshold fill value, such as 80% or 90% of the empty fill volume. A user may then press and autofill button that will automatically dispense the desired volume of liquid, e.g., to fill container 202 to 80% or 90% of the empty fill volume. It should be appreciated that these fill levels and monitoring techniques are only exemplary and may vary while remaining within scope of the present subject matter.

Referring still to FIGS. 3 through 5, dispense control systems 200 will be described in more detail according to exemplary embodiments. As shown, dispense control system 200 is operably coupled to dispensing assembly 140 and includes an emitter 214 and a receiver 216 positioned within or proximate to dispenser recess 142. Specifically, as illustrated, emitter 214 and receiver 216 are installed above base plane 204 (e.g., proximate a top of dispenser recess 142). According to exemplary embodiments, emitter 214 and receiver 216 are mounted on a single microchip or within a single device, though other configurations are possible. Alternatively, dispense control system 200 may be mounted at any other suitable location within refrigerator appliance 100 or may be used in any other suitable refrigerator appliance or dispensing assembly where accurate fluid dispensing is desired. The exemplary embodiments described herein are not intended to limit the scope of the present subject matter in any manner.

In general, emitter 214 may be the source of any form of energy which may be measured or detected by receiver 216, e.g., for detecting the presence, location, geometry, and/or orientation of container 202 (or liquid 106 contained therein) within dispensing recess 142. For example, according to the illustrated embodiment, emitter 214 and receiver 216 are an optical tracking system or laser tracking system. In this regard, for example, emitter 214 may include a laser diode or other suitable energy source for generating an energy beam 218. Similarly, receiver 216 may include an optical sensor or other suitable detector or sensor. In this manner, for example, emitter 214 and receiver 216 may generally define and operate as a LiDAR system, e.g., for detecting energy beam 218 after it has reflected off of container 202, liquid 206, base plane 204, etc. However, according to alternative embodiments, emitter 214 and receiver 216 may rely on principles of electromagnetism or other optical or sonar means for detecting positional and geometric data of container 202. Other devices for measuring this data are possible and within the scope of the present subject matter.

In general, emitter 214 is configured for generating and/or directing a single, linear energy beam 218 toward a single focal point onto a support surface of dispensing assembly 140, e.g., onto base plane 204 or objects positioned therein. When container 202 is positioned on base plane 204, the energy beam 218 directed from emitter 214 may strike a point on base plane 204, container 202, or liquid 206 (referred to herein as scanned point 220). After striking scanned point 220, the energy beam 218 may be reflected back to receiver 216 and may be monitored by a dedicated controller of dispense control system 200, controller 156, or any other suitable device. According to exemplary embodiments, based on the travel time it takes for energy beam 218 emitted from emitter 214 to be reflected back to receiver 216, dispense control system 200 may determine a distance that the laser has travelled. From this distance and known angles related to the direction of energy beam 218 or other system constants, trigonometric relationships may be used to determine a height of scanned point 220. By repeating this scanning process over the entire base plane 204 or container 202, and accurate image or representation of container 202 and liquid 206 stored therein may be obtained for improved autofill process.

Referring now specifically to FIGS. 4 and 5, dispense control system 200 may further include a scanning assembly 230 for selectively directing energy beam 218 along a scan path that includes a plurality of scanned positions. In this regard, for example, the scan path may include a zig-zag pattern within base plane 204, or any other suitable pattern of movement of the focal point of energy beam 218 within dispenser recess 142. Scanning assembly 230 may move energy beam 218 continuously, or may stop intermittently to permit the reading of reflected energy beam 218 at each of the plurality of positions along the scan path. As explained below, the scan path may be defined to obtain a two-dimensional representation of container 202, such that the scan path is a single line, e.g. traversing along the X-direction or the Z-direction. Thus, at each location along this line, dispense control system 200 may determine a height of scanning point 220 to obtain a two-dimensional representation or a height profile of container 202 and liquid 206 stored therein. By contrast, the scan path may be much more complex such that it passes along both the X-direction and is the Z-direction to form a three-dimensional representation of container 202 and liquid 206 stored therein. The exemplary scan paths and methods described herein are only exemplary and are not intended to limit the scope of the present subject matter in any manner.

According to the illustrated embodiment, scanning assembly 200 generally includes one or more rotatable or pivoting mirrors 232 which are configured for reflecting or redirecting energy beam 218 to desired locations (e.g., along the scan path). In order to provide accurate movement and precise location of mirrors 232, scanning assembly 230 may further include one or more servomotors 234, gyrometers 236, and/or galvanometers for moving and monitoring movement of mirrors 232, respectively. Although servomotors 234, gyrometers 236, and galvanometers are described herein as monitoring the position of mirrors 232, it should be appreciated that according to alternative embodiments, any other suitable positioning system may be used. Moreover, the entre scanning system can be miniaturized and executed as a micro electro mechanical system (MEMS) featuring microscopic mirrors and solid state, shape memory alloy, piezoelectric, or other suitable actuators.

Specifically, as shown FIG. 4, dispense control system 200 may be configured for obtaining a two-dimensional representation of container 202 and liquid 206 therein. In this regard, scanning assembly 230 includes a single first mirror 240 that is mounted such that it is rotatable about the X-direction and directs energy beam 218 within a YZ plane. By contrast, as shown in FIG. 5, scanning assembly 230 includes a second mirror 242 that is used in conjunction with first mirror 240 to position scanning point 200 at any location within a horizontal plane. In this manner, by determining a height of the scanning point 220 at each location, a three-dimensional representation of container 202 and liquid 206 may be obtained. Although two exemplary configurations of scanning assembly 230 are described herein, it should be appreciated that according to other embodiments, scanning assembly 230 may direct energy beam 218 using any other suitable devices and in any other suitable manner.

Figure 6:
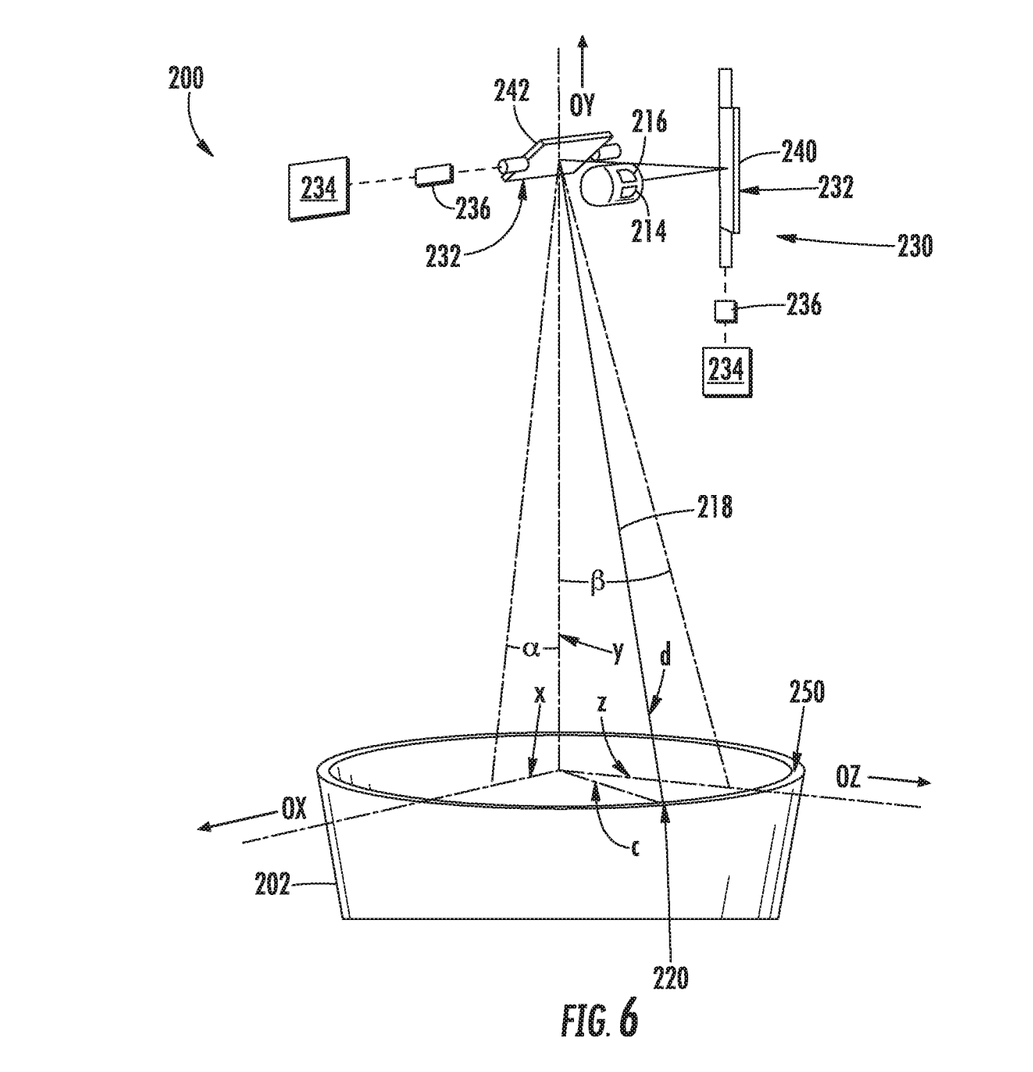
FIG. 6 provides a perspective view of the exemplary 3-D dispense control system of FIG. 5 scanning a container and defining the corresponding beam angles and projected components according to an exemplary embodiment.
Figure 7:
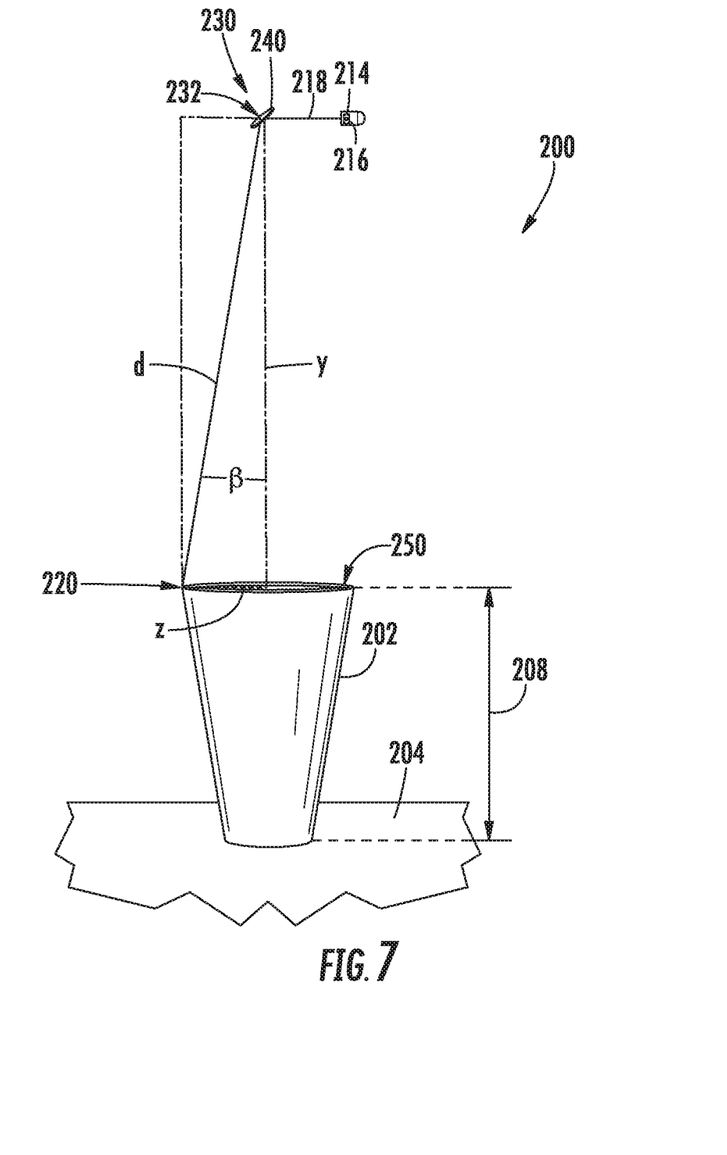
FIG. 7 provides a perspective view of the exemplary 2-D dispense control system of FIG. 4 scanning a container in only two dimensions and defining the corresponding beam angles and projected components according to an exemplary embodiment.

Referring now generally to FIGS. 6 and 7, a schematic view of the operation of dispense control system 200 is illustrated, including labeling or identification of certain reference planes, geometric constants or system constraints, and measured/calculated variables. Specifically, FIG. 6 illustrates a three-dimensional imaging of the dispenser recess 142, e.g., using dispense control system 200 illustrated in FIG. 5. By contrast, FIG. 7 illustrates a simplified two-dimensional imaging of dispenser recess 142. Notably, FIG. 7 illustrates dispense control system 200 from FIG. 4 as imaging container 202, but the system of FIG. 5 could also perform such imaging, e.g., by maintaining one of the mirrors 232 stationary. Similar, reference numerals or letters may be used to describe similar features between FIGS. 6 and 7.

Referring now specifically to FIG. 6, a schematic representation of dispense control system 200 scanning and arbitrary scanning point 220 on container 202 is illustrated. Specifically, FIG. 6 illustrates geometric parameters of dispense control system 200 measuring scanning point 220 within a three-dimensional space within dispenser recess 142. Specifically, as shown in FIG. 6, dispense control system 200 is determining the height of a top rim or lip 250 of container 202. As shown, geometric relations between energy beam 218, the XYZ components of energy beam 218, the angles of energy beam 218 relative to Y direction (e.g., corresponding to the vertical direction V), etc., are illustrated. Using trigonometric relationships and mathematical equations, a two- or three-dimensional representation of container 202 or liquid 206 stored therein may be obtained. Although FIG. 6 illustrates dispense control system 200 measuring top lip 250 of container 202, it should be appreciated that dispense control system 200 may be used to measure any other suitable location within dispenser recess 142 and the equations described below may apply to such measurements.

In general, the coordinates of an instantaneous scanned point 220 can be determined using the angular position of the mirrors 232 and the measured distance to the point provided by the sensor. In this regard, the angular position of each of the mirrors is known, controlled parameters, e.g., determined by gyrometers 236 or other suitable hardware. Specifically, as used herein, the angular position of first mirror 240 defines the angle $\alpha$, which affects the X-component of energy beam 218. The angular position of second mirror 242 defines the angle $\beta$, which affects the Z-component of energy beam 218. The magnitude of the distance measurement to scanned point 220 is a measured parameter, referred to herein as d. The parametric relationship between the inputs d, $\alpha$, and $\beta$ and the output coordinates X, Y, and Z can be derived as follows:

$$Y = \frac{d}{\sqrt{1 + \tan(\alpha)^2 + \tan(\beta)^2}}$$

$$X = \frac{d \cdot \tan(\alpha)}{\sqrt{1 + \tan(\alpha)^2 + \tan(\beta)^2}}$$

$$Z = \frac{d \cdot \tan(\beta)}{\sqrt{1 + \tan(\alpha)^2 + \tan(\beta)^2}}$$

Using the equations above, the known mirror angles, and the measured distance of the energy beam, a three-dimensional mapping of the dispenser recess may be generated. Particularly, according to the exemplary embodiment, the Y-component of the energy beam is equal to the vertical distance between scanned point 220 to the sensor assembly, i.e., emitter 214.

The equations provided above may apply to determine the height at any scanned point 220 at any X-position and Z-position. According to a one-dimensional application, the mirrors 232 may be oriented so that the scanning beam is in Y-direction (vertical), the measured distance d is equal to the vertical coordinate of the scanned point (d=Y) and the angles $\alpha$ and $\beta$ are equal to 0. For all other positions of the mirrors d≠Y and at least one of the angles ($\alpha$ or $\beta$)≠0.

The three-dimensional equations may be further simplified to a two-dimensional application. Specifically, to simplify the scanning process further, a two-dimensional scan may be performed, e.g., within a ZY plane. Thus, by setting α=0, the equations above are simplified as follows;

$$y = d \cdot \cos(\beta)$$

$$z = d \cdot \sin(\beta)$$

The exemplary control algorithms described above generally facilitate the measurement of a height of a container or the liquid therein to improve autofill processes. The algorithms typically include variety of input parameters, such as geometric constraints of the dispense control system 200, measured variables or distances, and any other suitable constants of values. Trigonometric functions and relationships are used to determine the actual height of an scanning point based on the position of the mirrors 232 and the travel time of the energy beam 218.

As one skilled in the art will appreciate, the above described embodiments are used only for the purpose of explanation. Modifications and variations may be applied, other configurations may be used, and the resulting configurations may remain within the scope of the invention. For example, dispense control system 200 may be positioned at any suitable location, emitter 214 and receiver 216 positioning may vary, alternative geometric and trigonometric relationships may be defined, and dispense control system 200 may operate in any other suitable manner. One skilled in the art will appreciate that such modifications and variations may remain within the scope of the present subject matter.

For example, dispense control system 200 and the associated algorithms described can be modified and used to determine dimensions or positioning of objects in other applications. Furthermore, dispense control system 200 may generally be used to determine the Z and X coordinates of an object (e.g., in addition to the height along the Y-direction).

Figure 8:
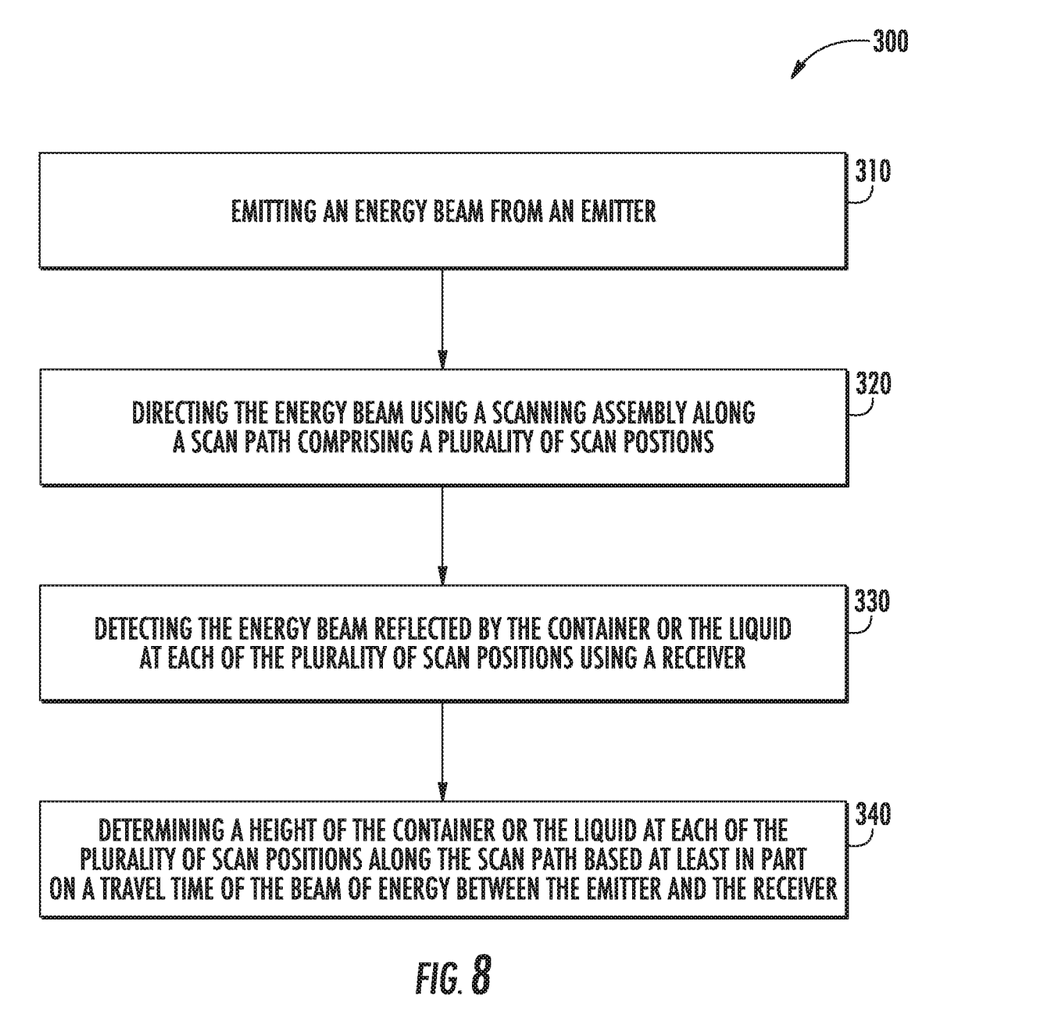
FIG. 8 provides a method for operating a dispense control system for determining a height of a container according to an exemplary embodiment of the present subject matter.

Now that the construction and configuration of refrigerator appliance 100 and dispense control system 200 have been presented according to an exemplary embodiment of the present subject matter, an exemplary method 300 for operating a dispense control system is provided. Method 300 can be used to operate dispense control system 200, or to operate any other suitable dispensing assembly. In this regard, for example, controller 156 may be configured for implementing method 300. However, it should be appreciated that the exemplary method 300 is discussed herein only to describe exemplary aspects of the present subject matter, and is not intended to be limiting.

As shown in FIG. 8, method 300 includes, at step 310, emitting an energy beam from an emitter. Specifically, for example, emitter 214 may be mounted within dispenser recess 142 and may direct energy beam 218 toward a scanning assembly 230. Step 320 includes directing an energy beam using the scanning assembly along a scan path including a plurality of scan positions. Step 330 includes detecting the energy beam reflected by the container or the liquid at each of the plurality of scan positions using a receiver, such as receiver 216. In this regard, scanning assembly 230 directs energy beam 218 along a desired scan path within dispenser recess 142 to generate an accurate three-dimensional representation of container 202 and liquid 206 located therein.

At step 340, a controller, such as controller 156, may determine a height of the container or liquid each of the plurality of scan positions along the scan path. For example, the controller may determine the height based on the distance traveled by energy beam 218, which may be determined, for example, based at least in part on the travel time of energy beam 218 between the emitter and the receiver. Specifically, controller 156 may precisely determine the amount of time it takes for energy beam 218 emitted from the emitter 214 to travel to receiver 216. Based on the travel time, controller 156 may know the distance d traveled by energy beam to scanning point 220. Using this distance d and the trigonometric relationships described above, controller 156 may precisely determine the height of scanning point 220. Moreover, by directing energy beam 218 along a line or within a plane using scanning assembly 230, an accurate two-dimensional or three-dimensional representation container 202 and liquid 206 may be obtained.

According to exemplary embodiments the present subject matter, dispense control system 200 may be used to detect a container height 208, e.g., of a top lip 250 of container 202. Dispense control system 200 may further monitor the liquid level 210 within container 202 and may stop a dispensing process when container 202 is full. According to still other embodiments, dispense control system may scan container 202 before liquid is added to determine an empty container volume. The fill process may commence and controller 156 may stop the fill process when a desired volume of liquid has been dispensed, e.g., wherein the desired fill volume is less than the empty container volume to prevent overfilling container 202. Other control algorithms and methods are possible and within scope of the present subject matter.

FIG. 8 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the method are explained using dispense control system 200 as an example, it should be appreciated that this method may be applied to the operation of any suitable appliance and/or dispensing assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber, the door defining a dispenser recess;
   a dispensing assembly positioned within the dispenser recess; and
   a dispense control system operably coupled to the dispensing assembly for filling a container with a liquid, the dispense control system comprising:
   an emitter for generating a beam of energy;
   a scanning assembly for selectively directing the beam of energy along a scan path comprising the one or more scan positions, the scanning assembly comprising a first mirror rotatably mounted to direct the beam of energy within a first plane and a second mirror rotatably mounted to direct the beam of energy within a second plane;

a receiver for detecting the beam of energy reflected by the container or the liquid at one or more scan positions; and a controller for determining a height of the container or the liquid at each of the one or more of scan positions based at least in part on a travel time of the beam of energy between the emitter and the receiver.

2. The refrigerator appliance of claim 1, wherein the controller is configured for identifying a top lip of the container and a liquid level of the liquid within the container.

3. The refrigerator appliance of claim 1, wherein the controller is configured for:

scanning the container before the liquid is added using the dispense control system;

determining an empty container volume;

commencing a fill process; and stopping the fill process when a desired volume of liquid has been dispensed, the desired volume of liquid being less than the empty container volume.

4. The refrigerator appliance of claim 1, wherein the scanning assembly comprises a plurality of mirrors, servomotors, and gyrometers.

5. The refrigerator appliance of claim 1, wherein the scanning assembly is a micro electro mechanical system (MEMS).

6. The refrigerator appliance of claim 1, wherein the emitter and the receiver are part of laser imaging, detection, and ranging (LiDAR) system.

7. The refrigerator appliance of claim 1, wherein the emitter is a laser and the receiver is an optical receiver.

8. The refrigerator appliance of claim 1, wherein the emitter and the receiver are mounted on a single microchip.

9. The refrigerator appliance of claim 1, wherein the emitter and the receiver are stationary and mounted at a top of the dispenser recess.

10. The refrigerator appliance of claim 1, wherein the emitter generates a linear beam.

11. The refrigerator appliance of claim 1, wherein the dispense control system generates a two-dimensional representation of the container and the liquid.

12. The refrigerator appliance of claim 1, wherein the dispense control system generates a three-dimensional representation of the container and the liquid.

13. A dispense control system for regulating a dispensing assembly to fill a container with a liquid, the dispense control system comprising:

an emitter for generating a beam of energy;

a scanning assembly for selectively directing the beam of energy along a scan path comprising the one or more scan positions, the scanning assembly comprising a first mirror rotatably mounted to direct the beam of energy within a first plane and a second mirror rotatably mounted to direct the beam of energy within a second plane;

a receiver for detecting the beam of energy reflected by the container or the liquid at each of one or more scan positions; and a controller for determining a height of the container or the liquid at each of the one or more scan positions based at least in part on a travel time of the beam of energy between the emitter and the receiver.

14. The dispense control system of claim 13, wherein the controller is configured for:

scanning the container before the liquid is added using the dispense control system;

determining an empty container volume;

commencing a fill process; and stopping the fill process when a desired volume of liquid has been dispensed, the desired volume of liquid being less than the empty container volume.

15. The dispense control system of claim 13, wherein the scanning assembly is a micro electro mechanical system (MEMS) comprising a plurality of mirrors, servomotors, and gyrometers.

16. The dispense control system of claim 13, wherein the dispense control system generates a two-dimensional or a three-dimensional representation of the container and the liquid.

* * * * *